United States Patent
Ko et al.

(10) Patent No.: US 10,306,528 B2
(45) Date of Patent: May 28, 2019

(54) INTERFERENCE CONTROL METHOD AND APPARATUS THEREFOR IN A HETEROGENEOUS SYSTEM

(71) Applicant: Samsung Electronics Co., Ltd., Suwon-si, Gyeonggi-do (KR)

(72) Inventors: Soomin Ko, Seoul (KR); Eunyong Kim, Yongin-si (KR); Byungwook Jun, Seoul (KR); Jaewon Kang, Seoul (KR); Kyungho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 15/114,589

(22) PCT Filed: Jan. 28, 2015

(86) PCT No.: PCT/KR2015/000880
§ 371 (c)(1),
(2) Date: Jul. 27, 2016

(87) PCT Pub. No.: WO2015/115785
PCT Pub. Date: Aug. 6, 2015

(65) Prior Publication Data
US 2016/0353451 A1 Dec. 1, 2016

Related U.S. Application Data

(60) Provisional application No. 61/932,513, filed on Jan. 28, 2014.

(30) Foreign Application Priority Data

Apr. 3, 2014 (KR) .................. 10-2014-0040208

(51) Int. Cl.
*H04W 36/20* (2009.01)
*H04W 16/04* (2009.01)
(Continued)

(52) U.S. Cl.
CPC .......... *H04W 36/20* (2013.01); *H04L 1/1822* (2013.01); *H04W 16/04* (2013.01); *H04W 16/06* (2013.01);
(Continued)

(58) Field of Classification Search
CPC .............................. H04W 36/20; H04W 16/04
See application file for complete search history.

(56) References Cited

U.S. PATENT DOCUMENTS 9,615,366 B2 * 4/2017 Ohta ...................... H04W 16/04
10,039,095 B2 * 7/2018 Yoshizawa ........ H04W 72/0426
(Continued)

FOREIGN PATENT DOCUMENTS

| CN | 102792747 A | 11/2012 |
|---|---|---|
| CN | 103220678 A | 7/2013 |

(Continued)

OTHER PUBLICATIONS

Interference Management in LTE-Advanced Heterogeneous Networks Using Almost Blank Subframes; Hisham El Shaer; Master's Degree Project Stockholm, Sweden; XR-EE-SB 2012:006; Mar. 2012.*

(Continued)

*Primary Examiner* — Hassan Kizou
*Assistant Examiner* — Deepa Belur
(74) *Attorney, Agent, or Firm* — Jefferson IP Law, LLP

(57) ABSTRACT

The present invention relates to an interference control method and an apparatus therefor in a heterogeneous system. To this end, the present invention relates to an interference control method for an almost blank subframe (ABS) ratio determination apparatus in a wireless communication system in which a cell range expansion (CRE) area is defined, comprising the steps of: receiving information about data load within a cell from one or more first cells, and (Continued)

one or more second cells; determining an ABS ratio on the basis of the wireless resource requirements of a CRE terminal with respect to the wireless resource requirements of all cells that are obtained from the data load information; and transmitting the determined ABS ratio to one of the first cells and the second cells.

20 Claims, 8 Drawing Sheets

(51) Int. Cl.

| | | |
|---|---|---|
| H04W 16/06 | (2009.01) | |
| H04W 16/08 | (2009.01) | |
| H04W 24/02 | (2009.01) | |
| H04L 1/18 | (2006.01) | |
| H04W 28/02 | (2009.01) | |
| H04W 68/00 | (2009.01) | |
| H04W 72/04 | (2009.01) | |
| H04W 74/08 | (2009.01) | |
| H04W 24/10 | (2009.01) | |
| H04W 28/08 | (2009.01) | |
| H04W 16/32 | (2009.01) | |
| H04W 36/04 | (2009.01) | |
| H04W 72/08 | (2009.01) | |

(52) U.S. Cl.
CPC ........... *H04W 16/08* (2013.01); *H04W 24/02* (2013.01); *H04W 24/10* (2013.01); *H04W 28/0236* (2013.01); *H04W 28/08* (2013.01); *H04W 68/005* (2013.01); *H04W 72/042* (2013.01); *H04W 72/0413* (2013.01); *H04W 72/0446* (2013.01); *H04W 74/0833* (2013.01); *H04W 16/32* (2013.01); *H04W 36/04* (2013.01); *H04W 72/0486* (2013.01); *H04W 72/082* (2013.01)

(56) References Cited

U.S. PATENT DOCUMENTS

| | | | |
|---|---|---|---|
| 2009/0310561 A1 | 12/2009 | Grob et al. | |
| 2011/0096660 A1 | 4/2011 | Ikeda et al. | |
| 2011/0300807 A1 | 12/2011 | Kwun et al. | |
| 2012/0115541 A1 | 5/2012 | Suga | |
| 2012/0176925 A1 | 7/2012 | Hwang | |
| 2012/0190365 A1 | 7/2012 | Jeong et al. | |
| 2012/0307808 A1 | 12/2012 | Song et al. | |
| 2013/0044704 A1 | 2/2013 | Pang et al. | |
| 2013/0045694 A1 | 2/2013 | Nakamura | |
| 2013/0065599 A1 | 3/2013 | Chan et al. | |
| 2013/0084865 A1* | 4/2013 | Agrawal ........... H04W 36/0083 455/436 |
| 2013/0107798 A1 | 5/2013 | Gao et al. | |
| 2013/0109384 A1 | 5/2013 | Abe et al. | |
| 2013/0230014 A1 | 9/2013 | Kitaji | |
| 2013/0237233 A1 | 9/2013 | Radulescu et al. | |
| 2013/0244664 A1 | 9/2013 | Song et al. | |
| 2013/0250764 A1 | 9/2013 | Vasudevan et al. | |
| 2013/0272274 A1 | 10/2013 | Ishida et al. | |
| 2013/0286906 A1 | 10/2013 | Seo et al. | |
| 2013/0329636 A1 | 12/2013 | Jiang et al. | |
| 2013/0343270 A1 | 12/2013 | Abe et al. | |
| 2014/0064237 A1 | 3/2014 | Lee et al. | |
| 2014/0198659 A1 | 7/2014 | Vargas et al. | |
| 2014/0204861 A1 | 7/2014 | Tie et al. | |
| 2014/0254512 A1 | 9/2014 | Ron et al. | |
| 2014/0254537 A1 | 9/2014 | Kim et al. | |
| 2014/0321434 A1* | 10/2014 | Gayde ............. H04W 72/0426 370/336 |
| 2015/0016374 A1 | 1/2015 | Liang et al. | |
| 2015/0031369 A1* | 1/2015 | Gunnarsson ......... H04W 36/04 455/438 |
| 2015/0085767 A1* | 3/2015 | Einhaus ............... H04L 1/0001 370/329 |
| 2015/0119053 A1 | 4/2015 | Morimoto et al. | |
| 2015/0126237 A1 | 5/2015 | Nagata et al. | |
| 2015/0146622 A1 | 5/2015 | Ren et al. | |
| 2015/0207596 A1* | 7/2015 | Kroener ............... H04W 16/08 370/329 |
| 2015/0208410 A1 | 7/2015 | Koutsimanis et al. | |
| 2015/0223135 A1* | 8/2015 | Ratasuk ............... H04W 16/32 455/436 |
| 2015/0327225 A1 | 11/2015 | Xia et al. | |
| 2015/0350919 A1* | 12/2015 | Patel ..................... H04W 16/18 370/252 |
| 2015/0358887 A1* | 12/2015 | Xu ......................... H04W 36/32 455/436 |
| 2015/0373728 A1 | 12/2015 | Cui et al. | |
| 2016/0066315 A1* | 3/2016 | Zhang ............... H04W 72/1226 370/329 |
| 2016/0233972 A1* | 8/2016 | Dinan ................... H04W 16/32 |

FOREIGN PATENT DOCUMENTS

| | | | | |
|---|---|---|---|---|
| CN | 103313312 A | 9/2013 | | |
| CN | 103369610 A | 10/2013 | | |
| CN | 103379574 A | 10/2013 | | |
| CN | 103686835 A | * 3/2014 | | |
| CN | 103686835 A | * 3/2014 | | |
| EP | 2 640 124 A1 | 9/2013 | | |
| GB | 2532792 A | * 6/2016 | ........ H04W 72/1263 |
| GB | 2532792 A | * 6/2016 | ........ H04W 72/1263 |
| JP | 2008-259046 A | 10/2008 | | |
| JP | 2011-035763 A | 2/2011 | | |
| JP | 2012-100220 A | 5/2012 | | |
| JP | 2013-526820 A | 6/2013 | | |
| JP | WO-2013152488 A1 | * 10/2013 | | |
| KR | 10-2013-0036832 A | 4/2013 | | |
| WO | 2013/112090 A2 | 8/2013 | | |
| WO | 2013/118567 A1 | 8/2013 | | |
| WO | 2013-135475 A1 | 9/2013 | | |
| WO | 2013/141624 A1 | 9/2013 | | |
| WO | WO-2015183575 A1 | * 12/2015 | ............ H04W 16/18 |
| WO | WO 2015183575 A1 | * 12/2015 | ............ H04W 16/18 |

OTHER PUBLICATIONS

Hisham El Shaer; Interference Management in LTE-Advanced Heterogeneous Networks Using Almost Blank Subframes; Master's Degree Project Stockholm, Sweden (Year: 2012).*
Alcatel-Lucent; Connected mode paging enhancement; 3GPP TSG-RAN WG2 Meeting #77bis; R2-121839; Mar. 26-30, 2012; Jeju, Korea.
Catt; Considering UE type for MLB enhancement; 3GPP TSG RAN WG3 Meeting #79; R3-130047; Jan. 28-Feb. 1, 2013; Malta.
Fujitsu; SON functions vs. UE types in CRE scenarios ; R3-130056; 3GPP TSG-RAN WG3 #79; R3-130056; Jan. 28-Feb. 1, 2013; Malta.
3GPP; 3rd Generation Partnership Project; Technical Specification Group Radio Access Network; Study on Small Cell enhancements for E-UTRA and E-UTRAN; Higher layer aspects (Release 12); 3GPP TR 36.842 V12.0.0; Dec. 2013; Valbonne, France.
Ismail Guvenc et al, 'Range Expansion and Inter-Cell Interference Coordination (ICIC) for Picocell Networks', Vehicular Technology Conference, Palo Alto California USA, Sep. 5, 2011.
"Connected mode paging enhancement", Alcatel-Lucent, 3GPP TSG RAN WG2 Meeting #77bis, R2-121839, Mar. 20, 2012.
Nokia Siemens Networks Enhanced Fast ABS Adaptation for Rel-12 Small Cell Scenario 1, 3GPP TSG-RAB WG1 #73 Meeting, May 11, 2013.
Japanese Office Action dated Jan. 4, 2019, issued in Japanese Patent Application No. 2016-549125.
Chinese Office Action dated Feb. 15, 2019, issued in Chinese Patent Application No. 201580006389.3.

(56) References Cited

OTHER PUBLICATIONS

Chinese Office Action dated Mar. 20, 2019, issued in Chinese Patent Application No. 201580006367.7.

* cited by examiner

INTERFERENCE CONTROL METHOD AND APPARATUS THEREFOR IN A HETEROGENEOUS SYSTEM

TECHNICAL FIELD

The present invention relates to a method and apparatus for controlling interference in a heterogeneous network system.

BACKGROUND ART

In recent years, the 3GPP has conducted research on picocells with a view to distributing the load of macrocells. The heterogeneous network environment where macrocells coexist with picocells has attracted much attention because it can improve system performance even further compared with the existing macrocell environment.

To efficiently distribute the load of macrocells over picocells, the 3GPP has introduced Enhanced Inter-Cell Interference Coordination (eICIC).

In general, picocells are lower in transmit power and antenna height compared with macrocells. Hence, when the rule of association between base station (ENB) and user equipment (UE) (a UE is served by the ENB with the highest signal strength) is applied, the load of macrocells may be not sufficiently distributed over picocells.

In other words, when each UE selects a cell with the highest Reference Signal Received Power (RSRP) as the serving cell, some UEs may connect to the macrocell although a picocell is the best cell. Such UEs may cause severe interference to the picocell, degrading overall network performance. In addition, when the number of UEs connected to the picocell is much smaller than the number of UEs connected to the macrocell, the efficiency of resource utilization may become very poor.

To address the above problem, eICIC provides Cell Range Expansion (CRE) to set a criterion for handover between macrocell and picocell. CRE enables higher user offloading from the macrocell on to picocells by requiring a UE to preferentially select a picocell if the received signal strength from the picocell is less than that from the macrocell by a preset CRE bias (dB).

However, UEs in the CRE zone connecting to the picocell can suffer from severe interference from the macrocell since the RSRP of the macrocell is higher than that of the picocell for such UEs.

To guarantee signal quality for UEs that would not receive a service from the picocell if the CRE bias were 0 dB (referred to as a CRE UE), the macrocell may reduce interference to the picocell by not transmitting data at a specific subframe. Such a subframe at which the macrocell does not transmit data is referred to as an Almost Blank Subframe (ABS). To enhance performance of the overall network including macrocells and picocells, it is necessary to appropriately set the ratio of ABSs to all subframes (ABS ratio).

In the related art, the ABS ratio may be determined on the basis of the number of UEs connected to the macrocell and the number of UEs connected to the picocell. The ABS ratio determined in this way may be appropriate when individual UEs need the same amount of radio resources.

However, determining the ABS ratio based on the number of macrocell UEs and picocell UEs may be inappropriate when UEs generate different amounts of traffic or need different amounts of radio resources owing to different channel quality levels. For example, when the macrocell serves five UEs needing 50 resource blocks (RB) per subframe and the picocell serves five UEs needing one RB per subframe, if the ABS ratio is determined based on the number of UEs, the ABS ratio may be set to a value larger than necessary although the number of subframes needed by the macrocell for data transmission is larger than that needed by the picocell.

Accordingly, it is necessary to provide a scheme for controlling interference in a heterogeneous network system including macrocells and picocells by efficiently determining the ABS ratio in consideration of overall network performance.

DISCLOSURE OF INVENTION

Technical Problem

An aspect of the present invention is to provide a method that can efficiently determine the ABS ratio for inter-cell interference control in a broadband wireless communication system including many macrocells and many picocells.

Another aspect of the present invention is to provide a method that enables individual cells to measure the load and to exchange the result of measurement to thereby determine the ABS ratio.

Solution to Problem

In accordance with an aspect of the present invention, there is provided a method of interference control for an almost blank subframe (ABS) ratio determination device in a wireless communication system with cell range expansion (CRE) zones. The method may include: receiving information on data load from at least one first cell and at least one second cell; determining an ABS ratio on the basis of information regarding the amount of radio resources needed for CRE user equipments (UEs) relative to the amount of radio resources needed for all cells, wherein the information is derived from the data load information; and sending the determined ABS ratio to one of the first cell and the second cell.

In accordance with another aspect of the present invention, there is provided a method of interference control for a base station (ENB) in a wireless communication system with CRE zones. The method may include: reporting information on data load to an almost blank subframe (ABS) ratio determination device; receiving ABS ratio information from the ABS ratio determination device; and sending and receiving data using a radio resource associated with an ABS configured according to the ABS ratio, wherein the ABS ratio is determined on the basis of information regarding the amount of radio resources needed for CRE UEs relative to the amount of radio resources needed for all cells, and the information is derived from data load information reported by at least one first cell and at least one second cell.

In accordance with another aspect of the present invention, there is provided a method of interference control for a base station (ENB) in a wireless communication system with CRE zones. The method may include: reporting information on data load to an almost blank subframe (ABS) ratio determination device; and sending and receiving data to and from CRE UEs through a radio resource that is associated with an ABS and is allocated by a neighbor ENB according to an ABS ratio determined based on the data load information, wherein the ABS ratio is determined on the basis of information regarding the amount of radio resources needed for CRE UEs relative to the amount of radio resources needed for all cells, and the information is derived from data load information reported by at least one first cell and at least one second cell.

In accordance with another aspect of the present invention, there is provided a device of almost blank subframe (ABS) ratio determination for interference control in a wireless communication system with cell range expansion (CRE) zones. The device may include: a communication unit to send and receive data; and a control unit to control a process of receiving information on data load from at least one first cell and at least one second cell, determining an ABS ratio on the basis of information regarding the amount of radio resources needed for CRE UEs relative to the amount of radio resources needed for all cells (the information being derived from the data load information), and sending the determined ABS ratio to one of the first cell and the second cell.

In accordance with another aspect of the present invention, there is provided a base station (ENB) supporting interference control in a wireless communication system with CRE zones. The base station may include: a communication unit to send and receive data; and a control unit to control a process of reporting information on data load to an ABS ratio determination device, receiving ABS ratio information from the ABS ratio determination device, and sending and receiving data using a radio resource associated with an ABS configured according to the ABS ratio, wherein the ABS ratio is determined on the basis of information regarding the amount of radio resources needed for CRE UEs relative to the amount of radio resources needed for all cells, and the information is derived from data load information reported by at least one first cell and at least one second cell.

In accordance with another aspect of the present invention, there is provided a base station (ENB) supporting interference control in a wireless communication system with CRE zones. The base station may include: a communication unit to send and receive data; and a control unit to control a process of reporting information on data load to an ABS ratio determination device, and sending and receiving data to and from CRE UEs through a radio resource that is associated with an ABS and is allocated by a neighbor ENB according to an ABS ratio determined based on the data load information, wherein the ABS ratio is determined on the basis of information regarding the amount of radio resources needed for CRE UEs relative to the amount of radio resources needed for all cells, and the information is derived from data load information reported by at least one first cell and at least one second cell.

Advantageous Effects of Invention

In a feature of the present invention, the interference control method can determine the ABS ratio by use of load information of each cell and increase the overall performance of the network system including macrocells and picocells.

MODE FOR THE INVENTION

The present invention may be applied to a broadband wireless communication system including many macrocells and many picocells. In the description of various embodiments, picocells are used as representative small cells. However, the present invention is not limited to picocells. The present invention may also be applied to other small cells such as nanocells or pemtocells.

In one embodiment, the CRE zone may be referred to as a reserved zone that is configured to distribute loads between cells.

The present invention relates to a method for controlling interference caused by a macrocell to picocells in a wireless communication system in which macrocells coexist with small cells. The present invention relates to a method for efficiently determining the time duration during which the macrocell is not allowed to perform downlink transmission so as to reduce interference affecting the picocell. In the present invention, the time duration during which the macrocell is not allowed to perform downlink transmission may be determined on the basis of load information exchanged between the macrocell and the picocell. To determine this time duration, the present invention provides a scheme that enables individual cells to measure their loads and to exchange the measurement information with one another.

Although the description of the present invention is based on 3rd Generation Partnership Project (3GPP) Long Term Evolution (LTE) standards for wireless communication, it can be extended to other communication systems.

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should be construed in accordance with the spirit of the invention.

Figure 1:
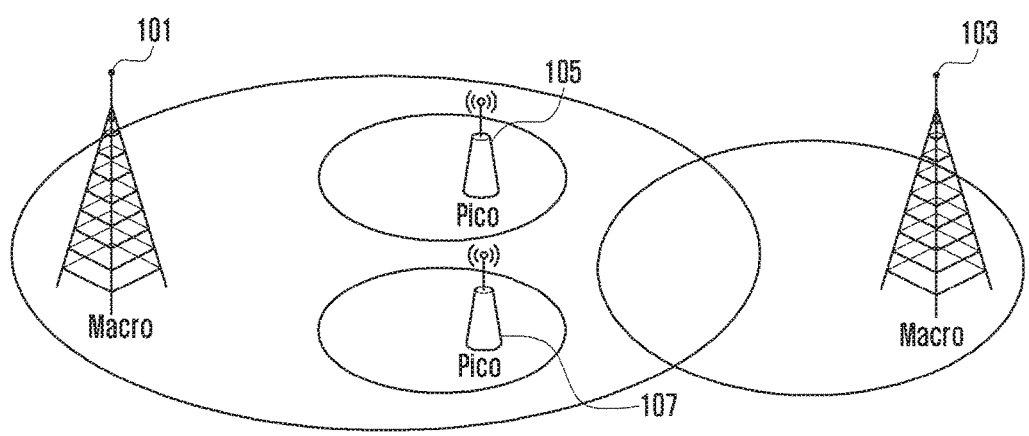
FIG. 1 illustrates the configuration of a wireless communication system to which the present invention is applied.

FIG. 1 illustrates the configuration of a wireless communication system to which the present invention is applied.

Referring to FIG. 1, the wireless communication system to which the present invention is applied may include at least one macrocell and at least one picocell.

A macrocell may be served by a macro ENB 101 or 103, and a picocell may be served by a pico ENB 105 or 107. Picocells may serve some of UEs in a macrocell to distribute the load of the macrocell.

The transmit power of the pico ENB 105 or 107 is much lower than that of the macro ENB 101 or 103, and the coverage of the pico ENB 105 or 107 is much smaller than that of the macro ENB 101 or 103.

A UE may connect to a macrocell or picocell to perform data communication. The UE may select a cell with the highest RSRP as the serving cell. When the UE selects a serving cell on the basis of the RSRP, the UE may connect to the macrocell although the picocell is the best cell for the UE. In this case, as the UE connected to the macrocell is close to the picocell, it may cause interference to those UEs receiving a service from the picocell.

To this context, even when the RSRP from the macrocell is higher than that from the picocell, CRE may be configured so that a specific UE may receive a service from the picocell. CRE is described in more detail with reference to FIG. 2.

Figure 2:
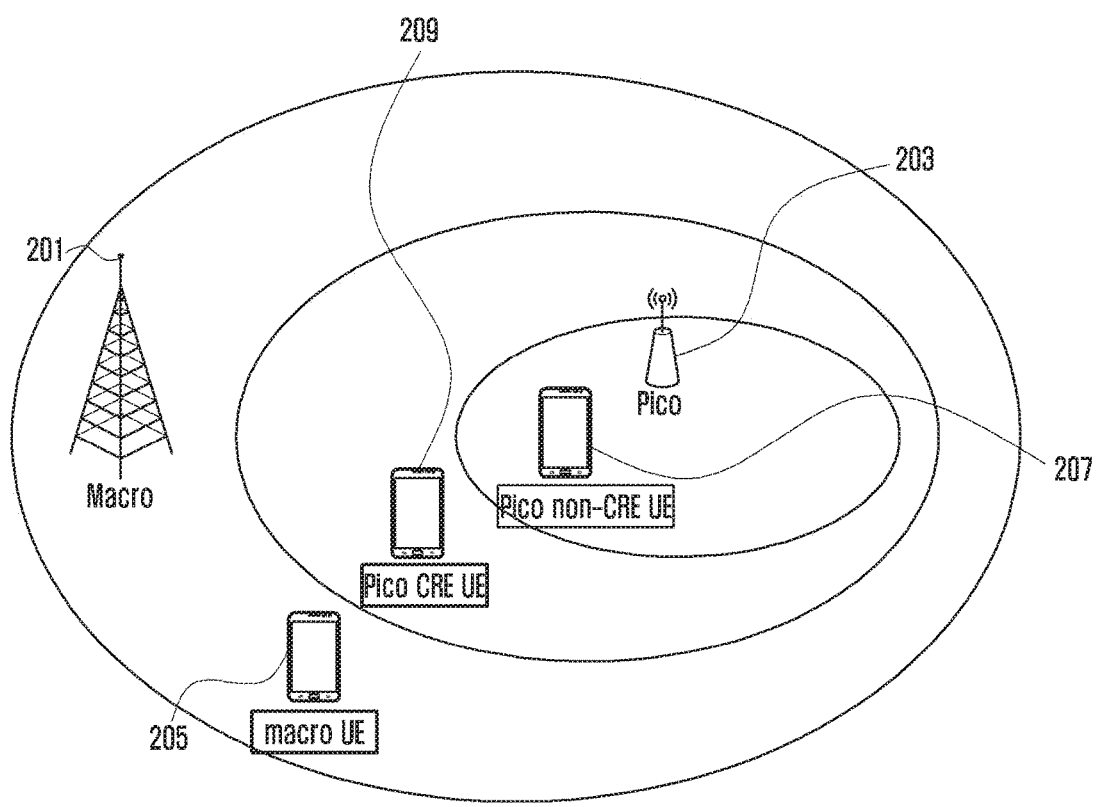
FIG. 2 illustrates a CRE UE.

FIG. 2 illustrates a CRE UE.

Referring to FIG. 2, in a wireless communication system of the present invention, UEs in a picocell may be classified into CRE UEs and non-CRE UEs.

In FIG. 2, for a UE in the macrocell, when the RSRP from the macro ENB 201 is higher than that from the pico ENB 203, the UE may receive a service from the macro ENB 201. In the following description, a UE receiving a service from the macro ENB 201 may be referred to as a macro UE (e.g. macro UE 205). Such a macro UE 205 may be closer to the macro ENB 201 than the pico ENB 203. While receiving a service from the macro ENB 201, the macro UE 205 does not severely suffer from interference caused by the picocell.

For a UE in the macrocell, when the RSRP from the macro ENB 201 is lower than that from the pico ENB 203, the UE may receive a service from the pico ENB 203. In the following description, a UE receiving a service from the pico ENB 203 may be referred to as a pico UE or non-CRE UE (e.g. non-CRE UE 207). Such a non-CRE UE 207 may be closer to the pico ENB 203 than the macro ENB 201.

In one embodiment, the network may force a certain UE to connect to the pico ENB 203 although the RSRP from the macro ENB 201 is higher than that from the pico ENB 203. This is to distribute the load of the macrocell over the picocell and provide a higher data rate to the UE. Here, the network may allow the UE to connect to the pico ENB 203 if the received signal strength from the picocell is less than that from the macrocell by a preset CRE bias (dB).

Allowing a UE outside the picocell to receive a service from the picocell may correspond to defining a new region between the macrocell and the picocell. In the following description, this region may be referred to as a CRE zone, and a UE operating in the CRE zone may be referred to as a CRE UE (e.g. CRE UE 209).

In one embodiment, a CRE UE may be a terminal severely suffering from interference caused by the macrocell, and a non-CRE UE may be a terminal hardly suffering from interference caused by the macrocell.

The CRE UE 209 receiving a service from the pico ENB 203 may severely suffer from interference caused by the macrocell as it remains in a region where the RSRP from the macro ENB 201 is higher than that from the pico ENB 203. Hence, to reduce interference to the CRE UE 209, the macro ENB 201 may configure some of total subframes as an ABS and does not perform downlink data transmission at the ABS. As the picocell does not suffer from interference caused by the macrocell at the ABS, if resources are allocated to the CRE UE 209 at the ABS, it is possible to increase performance of the CRE UE 209.

When the macro ENB 201 configures a large number of ABSs (i.e. the ABS ratio is high), this may increase the performance of UEs receiving a service from the picocell as the period free from interference caused by the macrocell becomes long. However, in this case, downlink transmission of the macrocell can be delayed, lowering the performance of macro UEs 205 receiving a service from the macro ENB 201. Although macro UEs 205 require a large number of subframes to receive downlink data, when a high ABS ratio is used for CRE UEs 209 because the number of CRE UEs 209 is large, the overall network performance may be degraded owing to reduced efficiency.

Next, a description is given of a scheme for controlling interference within the network by efficiently determining the ABS ratio according to an embodiment of the present invention.

Figure 3:
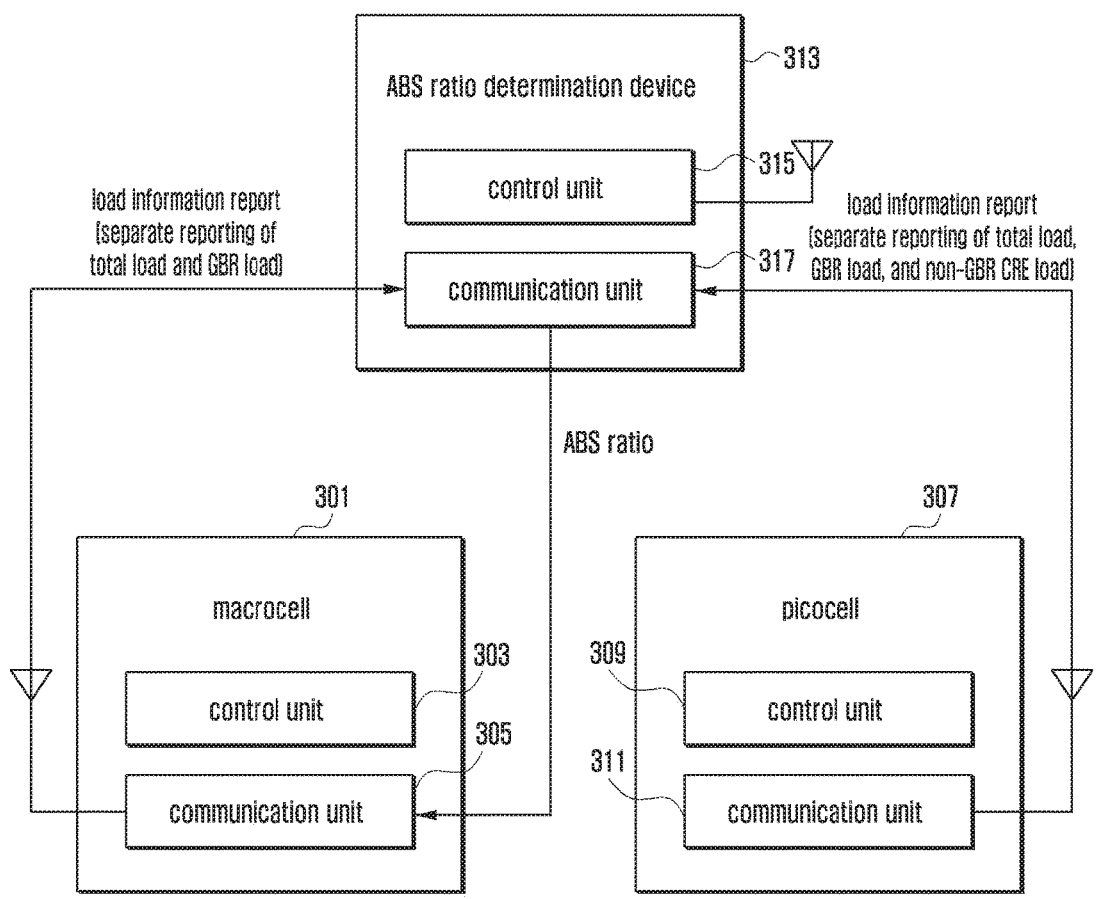
FIG. 3 is a block diagram of entities performing a method for determining the ABS ratio according to the present invention.

FIG. 3 is a block diagram of entities performing a method for determining the ABS ratio according to the present invention.

Referring to FIG. 3, in the present invention, ABS ratio determination may be performed by a macro ENB 301, a pico ENB 307, and an ABS ratio determination device 313.

The terms "macro ENB" and "macrocell" may be used interchangeably. The macro ENB 301 may include a control unit 303 and a communication unit 305.

The control unit 303 may include a separate load measurer or may operate as a load measurer to perform load measurement according to the present invention. The control unit 303 may measure the load of the cell and control reporting of the measured load information to the ABS ratio determination device 313.

Specifically, the control unit 303 may compute the load for macro UEs on the basis of information regarding the buffer occupancy (BO), the amount of transmittable data per RB, and the total number of RBs. Here, the control unit 303 may separately compute the load due to guaranteed bit rate (GBR) UEs (GBR load) and the load due to non-GBR UEs (non-GBR load). A GBR UE refers to a UE that receives a GBR traffic service, and a non-GBR UE refers to a UE that receives a non-GBR traffic service. The control unit 303 may compute the GBR load and the non-GBR load, and determine the total load by adding the GBR load and the non-GBR load together.

Load computation of the control unit 303 is described in detail later with reference to FIG. 4.

The control unit 303 may report the determined load information to the ABS ratio determination device 313. In one embodiment, the control unit 303 may report at least one of the total load, the GBR load, and the non-GBR load. For example, the control unit 303 may report the total load and the GBR load to the ABS ratio determination device 313.

The communication unit 305 may send and receive data to and from another device under the control of the control unit 303. The communication unit 305 may send load information to the ABS ratio determination device 313 or may receive ABS ratio information from the ABS ratio determination device 313.

The terms "pico ENB" and "picocell" may be used interchangeably. The pico ENB 307 may include a control unit 309 and a communication unit 311.

The control unit 309 may include a separate load measurer or may operate as a load measurer to perform load measurement according to the present invention. The control unit 309 may measure the load of the cell and control reporting of the measured load information to the ABS ratio determination device 313.

Specifically, the control unit 309 may compute the load for picocell UEs on the basis of information regarding the buffer occupancy (BO), the amount of transmittable data per RB, and the total number of RBs. Here, the control unit 309 may separately compute the GBR load, the load due to non-GBR CRE UEs (non-GBR CRE load), and the load due to non-GBR non-CRE UEs (non-GBR non-CRE load). A non-GBR CRE UE refers to a non-GBR UE that remains in the CRE zone to receive a service, and may severely suffer from interference caused by the macrocell. A non-GBR non-CRE UE refers to a non-GBR UE that remains in the picocell other than the CRE zone to receive a service, and may hardly suffer from interference caused by the macrocell.

Non-GBR UEs may be classified into non-GBR CRE UEs and non-GBR non-CRE UEs in various ways. For example, when the value obtained by dividing the spectral efficiency at an ABS by the spectral efficiency at a non-ABS (spectral efficiency at ABS/spectral efficiency at non-ABS) is greater than or equal to a preset threshold, a non-GBR UE may be classified into a non-GBR CRE UE. Otherwise, a non-GBR UE may be classified into a non-GBR non-CRE UE. As another example, when a non-GBR UE is unable to transmit at a non-ABS, it may be classified into a non-GBR CRE UE; and a non-GBR UE is able to transmit at a non-ABS, it may be classified into a non-GBR non-CRE UE.

The control unit 309 may compute the GBR load, the non-GBR CRE load, and the non-GBR non-CRE load, and determine the total load by adding them together.

Load computation of the control unit 309 is described in detail later with reference to FIG. 5.

The control unit 309 may report the determined load information to the ABS ratio determination device 313. In one embodiment, the control unit 309 may report at least one of the total load, the GBR load, the non-GBR CRE load, and the non-GBR non-CRE load. For example, the control unit 309 may report the total load, the GBR load, and the non-GBR CRE load to the ABS ratio determination device 313.

The communication unit 311 may send and receive data to and from another device under the control of the control unit 309. The communication unit 311 may send load information to the ABS ratio determination device 313 or may receive ABS ratio information from the ABS ratio determination device 313.

The ABS ratio determination device 313 may control at least one macro ENB (e.g. macro ENB 301) and at least one pico ENB (e.g. pico ENB 307) to determine the ABS ratio. In the present invention, the ABS ratio determination device 313 performing ABS ratio determination may be referred to as a different name such as an ABS control device or an interference control device.

In FIG. 3, the ABS ratio determination device 313 is depicted as a separate entity from the macro ENB 301 and the pico ENB 307. However, in various embodiments, the macro ENB 301 or the pico ENB 307 may perform the function of the ABS ratio determination device 313.

The ABS ratio determination device 313 may include a control unit 315 and a communication unit 317.

The control unit 315 may determine the ABS ratio on the basis of cell load information received from the macro ENB 301 and the pico ENB 307. The control unit 315 may determine the ABS ratio by using at least a portion of the received information. In one embodiment, the control unit 315 may determine the ABS ratio on the basis of the total load in the macrocell, the load due to CRE UEs in the picocell, and the load due to non-CRE UEs in the picocell.

For example, when the load due to CRE UEs in the picocell is relatively high, the control unit 315 may set the ABS ratio to a large value in order to reduce interference caused by the macro ENB 301 to the CRE UEs. When the load due to non-CRE UEs in the picocell is relatively high, the control unit 315 may set the ABS ratio to a small value in order to allow the macro ENB 301 to efficiently transmit data.

ABS ratio determination of the control unit 315 is described in detail later with reference to FIG. 6.

The control unit 315 may send the determined ABS ratio to the macro ENB 301, which then may configure ABSs according to the determined ABS ratio.

The communication unit 317 may send and receive data to and from another device under the control of the control unit 315. The communication unit 317 may receive load information from the macro ENB 301 and pico ENB 307 or may send determined ABS ratio information to the macro ENB 301.

FIG. 3 illustrates one macro ENB and one pico ENB. However, the present invention is not limited thereto. It may be evident that the subject matter of the present invention can also be applied to a situation where multiple macro ENBs and multiple pico ENBs are present.

Figure 4:
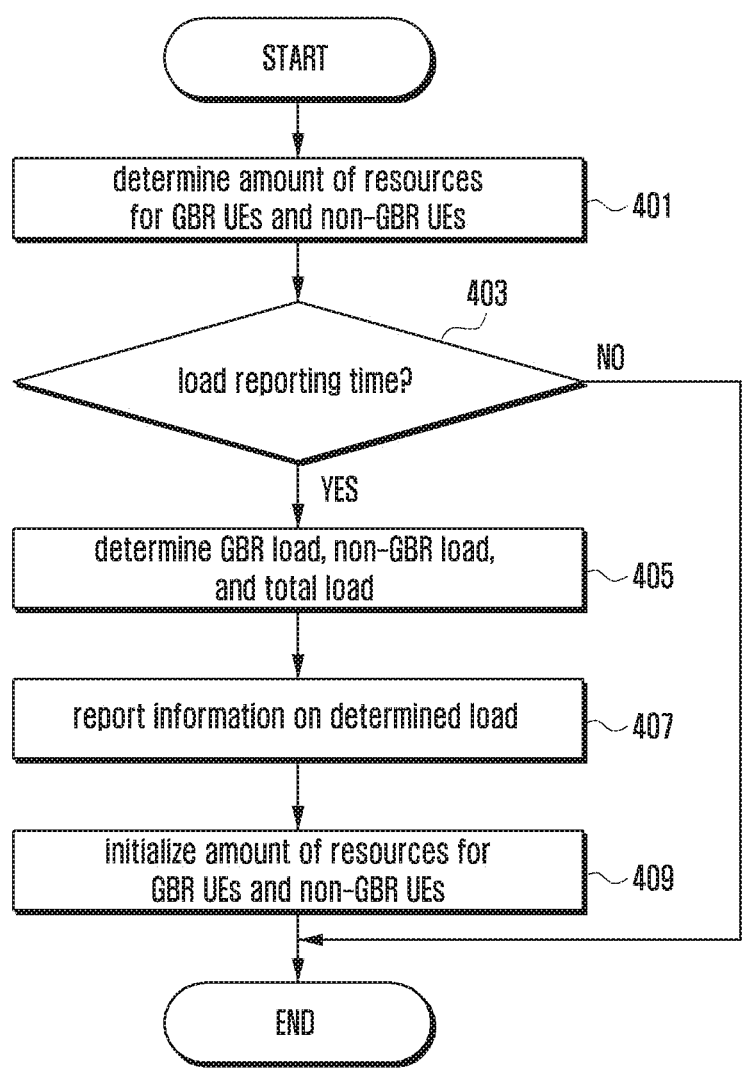
FIG. 4 is a flowchart of a procedure for a macro ENB to compute the load according to the present invention.

FIG. 4 is a flowchart of a procedure for a macro ENB to compute the load according to the present invention.

Referring to FIG. 4, at step 401, the macro ENB determines the amount of radio resources needed for GBR UEs and non-GBR UEs. Here, the amount of radio resources may refer to the number of RBs needed for GBR UEs and non-GBR UEs at a specific subframe. In the following description, the amount of radio resources, the amount of resources, the amount of needed resources, and the amount of used resources may be used interchangeably. The macro ENB may determine the total number of RBs needed for GBR UEs and non-GBR UEs.

The macro ENB may determine the amount of radio resources on the basis of the buffer occupancy for GBR UEs and non-GBR UEs (i.e. the amount of UE data to be transmitted).

When the current subframe is a non-ABS, the macro ENB may determine the amount of radio resources needed for GBR UEs and non-GBR UEs using Equation 1 below.

$$N_{RB}^{GBR} += \sum_{U \in GBR} \min\left\{\frac{BO(u)}{TBSperRB(u)}, N_{RB}^{DL}\right\} \quad \text{Equation 1}$$

$$N_{RB}^{nonGBR} += \sum_{U \in nonGBR} \min\left\{\frac{BO(u)}{TBSperRB(u)}, N_{RB}^{DL}\right\}$$

Here, $N_{RB}^{GBR}$ indicates the amount of radio resources for GBR UEs, $N_{RB}^{nonGBR}$ indicates the amount of radio resources for non-GBR UEs, BO(u) indicates the buffer occupancy (BO) for UE u, TBSperRB(u) indicates the amount of data transmittable per RB for UE u, and $N_{RB}^{DL}$ indicates the total number of RBs (the number of downlink RBs).

When the current subframe is an ABS, the macro ENB may determine the amount of radio resources needed for GBR UEs and non-GBR UEs using Equation 2 below.

$$N_{RB}^{GBR} += N_{RB}^{DL} \quad \text{Equation 2}$$

$$N_{RB}^{nonGBR} += 0$$

Here, $N_{RB}^{GBR}$ indicates the amount of radio resources for GBR UEs, $N_{RB}^{nonGBR}$ indicates the amount of radio resources for non-GBR UEs, and $N_{RB}^{DL}$ indicates the total number of RBs (the number of downlink RBs).

At step 403, the macro ENB checks whether a load reporting time is reached. The macro ENB may send a load report on a periodic basis or at a preset point in time. The macro ENB may collect information on the amount of radio resources for GBR UEs and non-GBR UEs before arrival of the load reporting time, and may initiate load computation on the basis of the collected information after arrival of the load reporting time.

In one embodiment, the macro ENB may send a load report once every W subframes (W subframe window). Here, the macro ENB may collect information during the W subframe window and compute the load on the basis of the collected information.

The macro ENB may determine whether the load reporting time is reached by performing modulo operation on the current subframe index and W. This may be represented as Equation 3 below.

$$\text{mod(subframe index}, W) \quad \text{Equation 3}$$

When Equation 3 produces a value of zero, the macro ENB may determine that the load reporting time is reached. When Equation 3 produces a value of non-zero, the macro ENB may determine that the load reporting time is not reached and continue information collection.

If the load reporting time is reached, at step 405, the macro ENB computes the load. The macro ENB may determine the GBR load, non-GBR load, and total load. The macro ENB may compute the load on the basis of the information on the amount of radio resources for GBR UEs and non-GBR UEs.

The macro ENB determines the GBR load according to Equation 4 below.

$$L^{GBR} = \frac{N_{RB}^{GBR}}{W \cdot N_{RB}^{DL}} \quad \text{Equation 4}$$

Here, $L^{GBR}$ indicates the GBR load, $N_{RB}^{GBR}$ indicates the amount of radio resources for GBR UEs, W indicates the window size, and $N_{RB}^{DL}$ indicates the total number of RBs (the number of downlink RBs).

The macro ENB determines the non-GBR load according to Equation 5 below.

$$L^{nonGBR} = \frac{1}{W \cdot N_{RB}^{DL}} \cdot \frac{W \cdot N_{RB}^{DL} - N_{RB}^{GBR}}{W \cdot N_{RB}^{DL} + N_{RB}^{nonGBR}} \cdot N_{RB}^{nonGBR} \quad \text{Equation 5}$$

Here, $L^{nonGBR}$ indicates the non-GBR load, W indicates the window size, $N_{RB}^{DL}$ indicates the total number of RBs (the number of downlink RBs), $N_{RB}^{GBR}$ indicates the amount of radio resources for GBR UEs, and $N_{RB}^{nonGBR}$ indicates the amount of radio resources for non-GBR UEs.

The macro ENB computes the total load by adding the GBR load and the non-GBR load together. This may be represented as Equation 6 below.

$$L^{macro} = L^{GBR} + L^{nonGBR} \quad \text{Equation 6}$$

Here, $L^{macro}$ indicates the total load of the macrocell, $L^{GBR}$ indicates the GBR load, and $L^{nonGBR}$ indicates the non-GBR load.

Upon determining the load, at step 407, the macro ENB reports information on the load. The macro ENB may report at least a portion of the information on the load to the ABS ratio determination device.

The macro ENB may report at least one of the total load, GBR load, and non-GBR load in the macrocell. For example, if the total load and GBR load for the macrocell are known to the ABS ratio determination device, as the ABS ratio determination device may also identify the non-GBR load, the macro ENB may report at least two of the total load, GBR load, and non-GBR load in the macrocell. That is, the macro ENB may report only the total load and GBR load for the macrocell. This may reduce data traffic between the macro ENB and the ABS ratio determination device.

In various embodiments, the macro ENB may report the determined load values as is, or may convert the load values into other values and report the converted values. For reporting, the macro ENB may convert the total load value and the GBR load value into Composite Available Capacity (CAC) and GBR usage values, respectively. The CAC and GBR usage are the same as those defined in the LTE standards. This conversion may be represented as Equation 7 below.

$$CAC = (1 - L^{macro}) \times 100$$

$$GBR\_Usage = (L^{GBR}) \times 100 \quad \text{Equation 7}$$

The CAC and GBR usage are just an example of available conversion schemes. As the CAC value is obtained based on a load of 1, a high load value is converted into a small CAC value. That is, as the CAC represents the available capacity, the available capacity becomes small when the load is high. Hence, in the following description, phrases "high load" and "low load" may correspond respectively to "low CAC" and "high CAC".

It is necessary for the macro ENB and the ABS ratio determination device to share information regarding the CAC and GBR usage conversion rule according to Equation 7 in advance.

After reporting the load information, at step 409, the macro ENB initializes the amount of radio resources for GBR UEs and non-GBR UEs for subsequent load computation.

As described above, to compute the load of the macrocell, the load due to GBR UEs and the load due to non-GBR UEs are separately computed. In this case, if the number of GBR UEs or non-GBR UEs is large, load computation may become complicated. To reduce complexity of load computation, the macro ENB may select some of GBR UEs and some of non-GBR UEs, compute the load for the selected GBR and non-GBR UEs, and extrapolate the computed load into the case of all GBR UEs in the macrocell.

Specifically, the macro ENB may select some GBR UEs among all the GBR UEs and form a sample_GBR set of the selected GBR UEs. The macro ENB may compute the load due to UEs belonging to the sample_GBR set only, and may determine the GBR load by multiplying the computed load and a scaling factor (scaling_GBR) together. Here, the scaling factor may be determined by dividing the total number of GBR UEs by the number of UEs in the sample_GBR set (total number of GBR UEs/number of UEs in sample_GBR set).

The sample_GBR set may be determined in various ways. For example, the macro ENB may randomly select some UEs for the sample_GBR set from among GBR UEs on a subframe basis. As another example, the macro ENB may randomly select some UEs for the sample_GBR set from among GBR UEs whose BO is greater than zero on a subframe basis.

Likewise, the macro ENB may select some UEs from among all non-GBR UEs and form a sample_nonGBR set of the selected non-GBR UEs. The macro ENB may compute the load due to UEs belonging to the sample_nonGBR set only, and may determine the non-GBR load by multiplying the computed load and a scaling factor (scaling_nonGBR) together. Here, the scaling factor may be determined by dividing the total number of non-GBR UEs by the number of UEs in the sample_nonGBR set (total number of non-GBR UEs/number of UEs in sample_nonGBR set).

The sample_nonGBR set may be determined in a manner similar to the case of the sample_GBR set.

When the above scheme is used, the amount of radio resources for GBR UEs and non-GBR UEs may be computed according to Equation 8.

$$N_{RB}^{GBR} \mathrel{+}= \text{scaling\_GBR} \times \sum_{u \in sample\_GBR} \min\left\{\frac{BO(u)}{TBSperRB(u)}, N_{RB}^{DL}\right\}$$

$$N_{RB}^{nonGBR} \mathrel{+}= \text{scaling\_nonGBR} \times \sum_{u \in sample\_nonGBR} \min\left\{\frac{BO(u)}{TBSperRB(u)}, N_{RB}^{DL}\right\}$$

Equation 8

The macro ENB may use the amount of radio resources for GBR UEs and non-GBR UEs computed using Equation 8 to determine the total load, GBR load, and non-GBR load in the macrocell.

Figure 5:
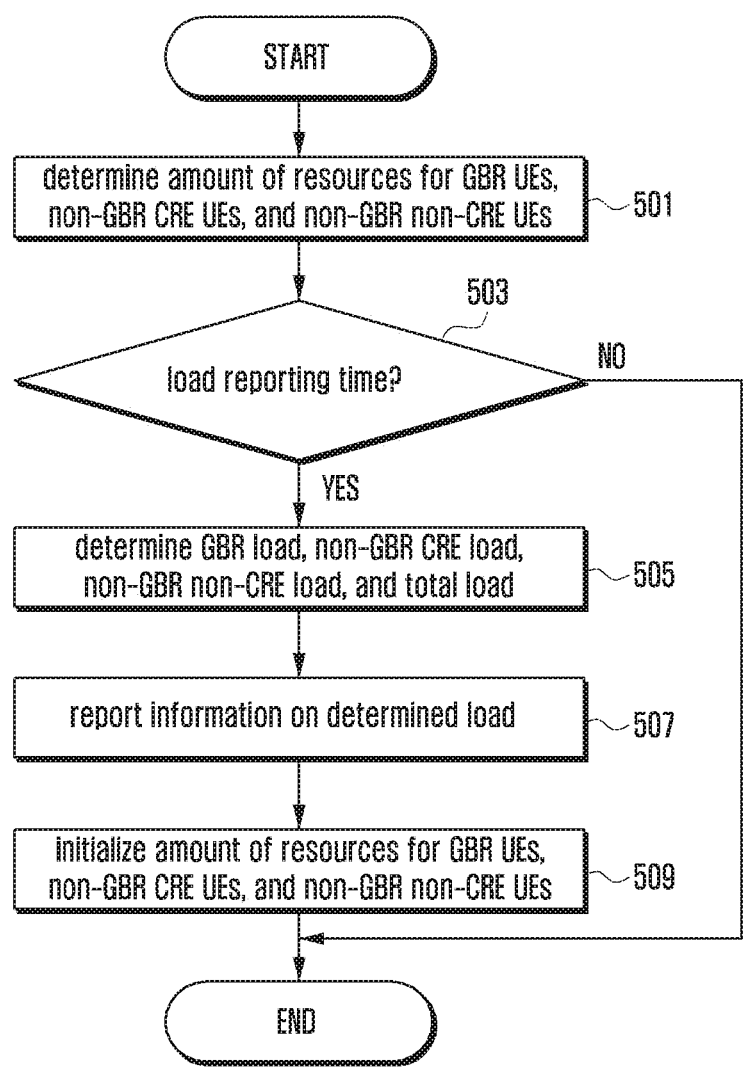
FIG. 5 is a flowchart of a procedure for a pico ENB to compute the load according to the present invention.

FIG. 5 is a flowchart of a procedure for a pico ENB to compute the load according to the present invention.

Referring to FIG. 5, at step 501, the pico ENB determines the amount of radio resources needed for GBR UEs, non-GBR CRE UEs, and non-GBR non-CRE UEs. Here, the amount of radio resources may refer to the number of RBs needed for GBR UEs, non-GBR CRE UEs, and non-GBR non-CRE UEs at a specific subframe. The pico ENB may determine the total number of RBs needed for GBR UEs, non-GBR CRE UEs, and non-GBR non-CRE UEs.

The pico ENB may determine the amount of radio resources on the basis of the buffer occupancy for GBR UEs, non-GBR CRE UEs, and non-GBR non-CRE UEs (i.e. the amount of UE data to be transmitted).

The pico ENB may determine the amount of radio resources needed for GBR UEs, non-GBR CRE UEs, and non-GBR non-CRE UEs using Equation 9 below.

$$N_{RB}^{GBR} \mathrel{+}= \sum_{u \in GBR} \min\left\{\frac{BO(u)}{TBSperRB(u)}, N_{RB}^{DL}\right\}$$

$$N_{RB}^{nonGBR,nonCRE} \mathrel{+}= \sum_{u \in nonGBR\&nonCRE} \min\left\{\frac{BO(u)}{TBSperRB(u)}, N_{RB}^{DL}\right\}$$

$$N_{RB}^{nonGBR,CRE} \mathrel{+}= \sum_{u \in nonGBR\&CRE} \min\left\{\frac{BO(u)}{TBSperRB(u)}, N_{RB}^{DL}\right\}$$

Equation 9

Here, $N_{RB}^{GBR}$ indicates the amount of radio resources for GBR UEs, $N_{RB}^{nonGBR,nonCRE}$ indicates the amount of radio resources for non-GBR non-CRE UEs, $N_{RB}^{nonGBR,CRE}$ indicates the amount of radio resources for non-GBR CRE UEs, BO(u) indicates the buffer occupancy (BO) for UE u, TBSperRB(u) indicates the amount of data transmittable per RB for UE u, and $N_{RB}^{DL}$ indicates the total number of RBs (the number of downlink RBs).

At step 503, the pico ENB checks whether a load reporting time is reached. The pico ENB may send a load report on a periodic basis or at a preset point in time. The pico ENB may collect information on the amount of radio resources for GBR UEs, non-GBR CRE UEs, and non-GBR non-CRE UEs before arrival of the load reporting time, and may initiate load computation on the basis of the collected information after arrival of the load reporting time.

In one embodiment, the pico ENB may send a load report once every W subframes (W subframe window). Here, the pico ENB may collect information during the W subframe window and compute the load on the basis of the collected information.

The pico ENB may determine whether the load reporting time is reached by performing modulo operation on the current subframe index and W. This may be represented as Equation 10 below.

$$\text{mod(subframe index}, W)$$

Equation 10

When Equation 10 produces a value of zero, the pico ENB may determine that the load reporting time is reached. When Equation 10 produces a value of non-zero, the pico ENB may determine that the load reporting time is not reached and continue information collection.

If the load reporting time is reached, at step 505, the pico ENB computes the load. The pico ENB may determine the GBR load, non-GBR CRE load, non-GBR non-CRE load, and total load. The pico ENB may compute the load on the basis of the information on the amount of radio resources for GBR UEs, non-GBR CRE UEs, and non-GBR non-CRE UEs.

The pico ENB determines the GBR load according to Equation 11 below.

$$L^{GBR} = \frac{N_{RB}^{GBR}}{W \cdot N_{RB}^{DL}}$$

Equation 11

Here, $L^{GBR}$ indicates the GBR load, $N_{RB}^{GBR}$ indicates the amount of radio resources for GBR UEs, W indicates the window size, and $N_{RB}^{DL}$ indicates the total number of RBs (the number of downlink RBs).

The pico ENB determines the non-GBR CRE load according to Equation 12 below.

$$L^{nonGBR,CRE} = \frac{1}{W \cdot N_{RB}^{DL}} \cdot \frac{W \cdot N_{RB}^{DL} - N_{RB}^{GBR}}{W \cdot N_{RB}^{DL} + N_{RB}^{nonGBR,nonCRE} + N_{RB}^{nonGBR,CRE}} \cdot N_{RB}^{nonGBR,CRE}$$

Equation 12

Here, $L^{nonGBR,CRE}$ indicates the non-GBR CRE load, W indicates the window size, $N_{RB}^{DL}$ indicates the total number of RBs (the number of downlink RBs), $N_{RB}^{GBR}$ indicates the amount of radio resources for GBR UEs, $N_{RB}^{nonGBR,nonCRE}$ indicates the amount of radio resources for non-GBR non-CRE UEs, and $N_{RB}^{nonGBR,CRE}$ indicates the amount of radio resources for non-GBR CRE UEs.

The pico ENB determines the non-GBR non-CRE load according to Equation 13 below.

$$L^{nonGBR,nonCRE} = \frac{1}{W \cdot N_{RB}^{DL}} \cdot \frac{W \cdot N_{RB}^{DL} - N_{RB}^{GBR}}{W \cdot N_{RB}^{DL} + N_{RB}^{nonGBR,nonCRE} + N_{RB}^{nonGBR,CRE}} \cdot N_{RB}^{nonGBR,nonCRE}$$

Equation 13

Here, $L^{nonGBR,nonCRE}$ indicates the non-GBR non-CRE load, W indicates the window size, $N_{RB}^{DL}$ indicates the total number of RBs (the number of downlink RBs), $N_{RB}^{GBR}$ indicates the amount of radio resources for GBR UEs, $N_{RB}^{nonGBR,nonCRE}$ indicates the amount of radio resources for non-GBR non-CRE UEs, and $N_{RB}^{nonGBR,CRE}$ indicates the amount of radio resources for non-GBR CRE UEs.

The pico ENB computes the total load by adding the GBR load, non-GBR CRE load, and non-GBR non-CRE load together. This may be represented as Equation 14 below.

$$L^{pico}=L^{GBR}+L^{nonGBR,nonCRE}+L^{nonGBR,CRE} \quad \text{Equation 14}$$

Here, $L^{pico}$ indicates the total load of the picocell, $L^{GBR}$ indicates the GBR load, $L^{nonGBR,CRE}$ indicates the non-GBR CRE load, and $L^{nonGBR,nonCRE}$ indicates the non-GBR non-CRE load.

Upon determining the load, at step 507, the pico ENB reports information on the load. The pico ENB may report at least a portion of the information on the load to the ABS ratio determination device.

The pico ENB may report at least one of the total load, GBR load, non-GBR CRE load, and non-GBR non-CRE load in the macrocell. For example, if the total load, non-GBR CRE load, and non-GBR non-CRE load for the picocell are known to the ABS ratio determination device, as the ABS ratio determination device may also identify the GBR load, the pico ENB may report at least three of the total load, GBR load, non-GBR CRE load, and non-GBR non-CRE load in the picocell. That is, the pico ENB may report only the total load, GBR load, and non-GBR CRE load for the picocell. This may reduce data traffic between the pico ENB and the ABS ratio determination device.

In various embodiments, the pico ENB may report the determined load values as is, or may convert the load values into other values and report the converted values. For reporting, the pico ENB may convert the total load value, the GBR load value, and the non-GBR CRE load value into Composite Available Capacity (CAC), GBR usage, and DL ABS Status (DAs) values, respectively. The CAC, GBR usage, and DAs are the same as those defined in the LTE standards. This conversion may be represented as Equation 15 below.

$$CAC=(1-L^{pico})\times100$$

$$DAs=(1-L^{nonGBR,CRE})\times100$$

$$GBR\_Usage=(L^{GBR})\times100 \quad \text{Equation 15}$$

It is necessary for the pico ENB and the ABS ratio determination device to share information regarding the CAC, GBR usage, and DAs conversion rule according to Equation 15 in advance.

After reporting the load information, at step 509, the pico ENB initializes the amount of radio resources for GBR UEs, non-GBR CRE UEs, and non-GBR non-CRE UEs for subsequent load computation.

As described above, to compute the load of the picocell, the load due to GBR UEs, the load due to non-GBR CRE UEs, and the load due to non-GBR non-CRE UEs are separately computed. In this case, if the number of GBR UEs or non-GBR UEs is large, load computation may become complicated. To reduce complexity of load computation, the pico ENB may select some of GBR UEs and some of non-GBR UEs, compute the load for the selected GBR and non-GBR UEs, and extrapolate the computed load into the case of all UEs in the picocell.

Specifically, the pico ENB may select some GBR UEs among all the GBR UEs and form a sample_GBR set of the selected GBR UEs. The pico ENB may compute the load due to UEs belonging to the sample_GBR set only, and may determine the GBR load by multiplying the computed load and a scaling factor (scaling_GBR) together. Here, the scaling factor may be determined by dividing the total number of GBR UEs by the number of UEs in the sample_GBR set (total number of GBR UEs/number of UEs in sample_GBR set).

The sample_GBR set may be determined in various ways. For example, the pico ENB may randomly select some UEs for the sample_GBR set from among GBR UEs on a subframe basis. As another example, the pico ENB may randomly select some UEs for the sample_GBR set from among GBR UEs whose BO is greater than zero on a subframe basis.

Likewise, the pico ENB may select some UEs from among all non-GBR CRE UEs and form a sample_nonGBR-CRE set of the selected non-GBR CRE UEs. The pico ENB may compute the load due to UEs belonging to the sample_nonGBR-CRE set only, and may determine the non-GBR CRE load by multiplying the computed load and a scaling factor (scaling_nonGBR-CRE) together. Here, the scaling factor may be determined by dividing the total number of non-GBR UEs by the number of UEs in the sample_non-GBR-CRE set (total number of non-GBR UEs/number of UEs in sample_nonGBR-CRE set).

In addition, the pico ENB may select some UEs from among all non-GBR non-CRE UEs and form a sample_non-GBR-nonCRE set of the selected non-GBR non-CRE UEs. The pico ENB may compute the load due to UEs belonging to the sample_nonGBR-nonCRE set only, and may determine the non-GBR non-CRE load by multiplying the computed load and a scaling factor (scaling_nonGBR-nonCRE) together. Here, the scaling factor may be determined by dividing the total number of non-GBR UEs by the number of UEs in the sample_nonGBR-nonCRE set (total number of non-GBR UEs/number of UEs in sample_nonGBR-nonCRE set).

When the above scheme is used, the amount of radio resources for GBR UEs, non-GBR CRE UEs, and non-GBR non-CRE UEs may be computed according to Equation 16 below.

$$N_{RB}^{GBR} \mathrel{+}= scaling\_GBR \times \sum_{u \in sample\_GBR} \min\left\{\frac{BO(u)}{TBSperRB(u)}, N_{RB}^{DL}\right\}$$

$$N_{RB}^{nonGBR,nonCRE} \mathrel{+}= scaling\_nonGBR\text{-}nonCRE \times \sum_{u \in sample\_nonGBR\text{-}nonCRE} \min\left\{\frac{BO(u)}{TBSperRB(u)}, N_{RB}^{DL}\right\}$$

$$N_{RB}^{nonGBR,CRE} \mathrel{+}= scaling\_nonGBR\text{-}nonCRE \times \sum_{u \in sample\_nonGBR\text{-}CRE} \min\left\{\frac{BO(u)}{TBSperRB(u)}, N_{RB}^{DL}\right\}$$

$$\text{Equation 16}$$

The macro ENB may use the amount of radio resources for GBR UEs, non-GBR CRE UEs, and non-GBR non-CRE UEs computed using Equation 16 to determine the total load, GBR load, non-GBR CRE load, and non-GBR non-CRE load in the picocell.

Figure 6:
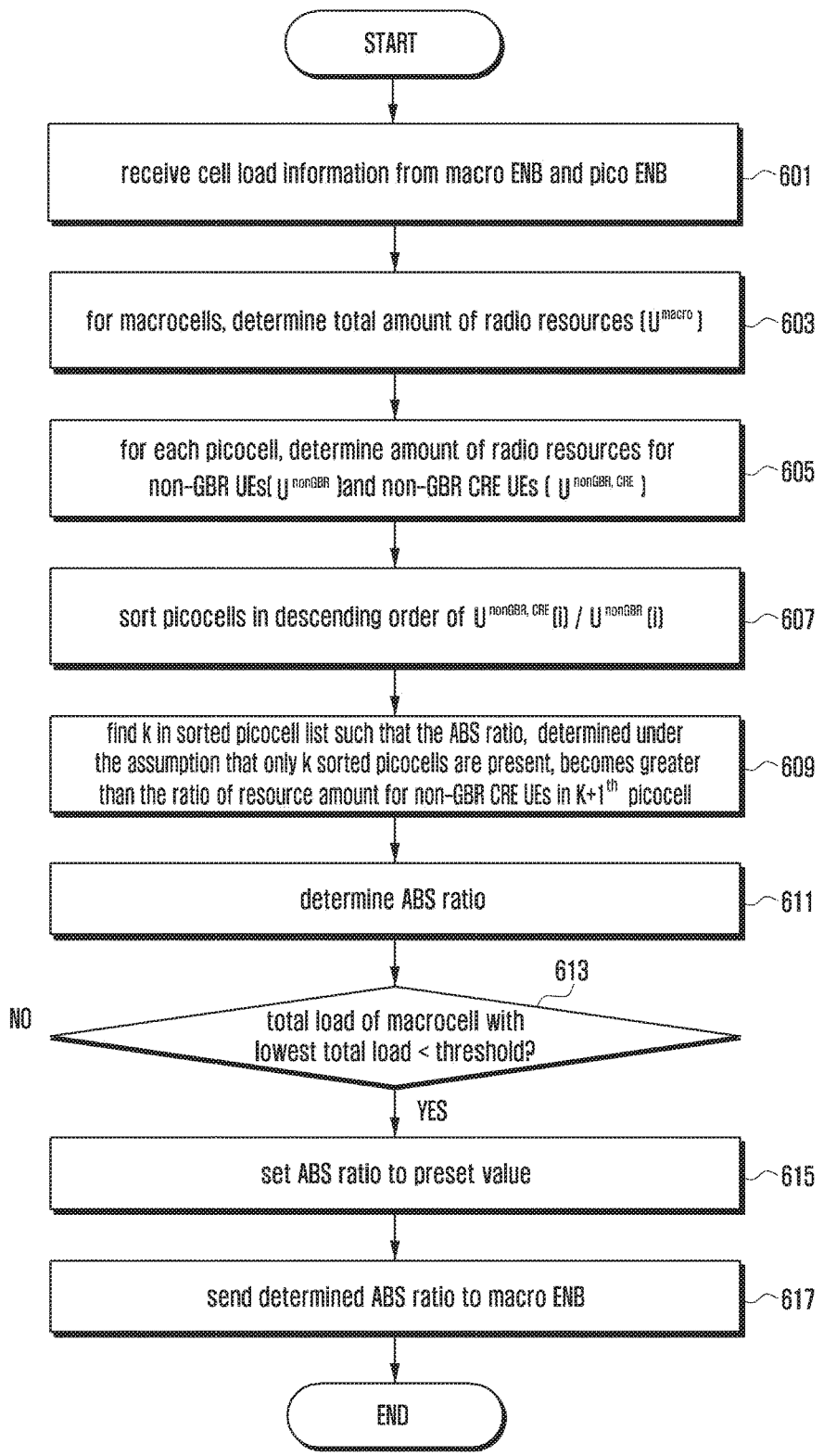
FIG. 6 is a flowchart of a procedure for an ABS ratio determination device to determine the ABS ratio according to the present invention.

FIG. 6 is a flowchart of a procedure for an ABS ratio determination device to determine the ABS ratio according to the present invention.

Referring to FIG. 6, at step 601, the ABS ratio determination device receives load information from a macro ENB and a pico ENB. The ABS ratio determination device may receive cell load information from at least one macro ENB and at least one pico ENB.

Load information from a macro ENB may include information on at least one of the total load, GBR load, and non-GBR load in the corresponding macrocell. Load information from a pico ENB may include information on at least one of the total load, GBR load, non-GBR CRE load, and non-GBR non-CRE load in the corresponding picocell.

The ABS ratio determination device may determine the ABS ratio on the basis of the received load information.

Specifically, at step 603, the ABS ratio determination device determines the amount of radio resources for non-GBR UEs in each macrocell and the amount of radio resources for all macrocells. The ABS ratio determination device may identify the amount of radio resources for non-GBR UEs in each macrocell on the basis of the reported load information, and determine the amount of radio resources for the macrocell using the identified information. In one embodiment, when the GBR load and total load of a macrocell are reported to the ABS ratio determination device, the ABS ratio determination device may identify the non-GBR load for the macrocell on the basis of the reported information.

The amount of radio resources for non-GBR UEs in each macrocell and the amount of radio resources for all macrocells may be determined according to Equation 17 below.

$$U^{nonGBR}(j) = \frac{100 - \text{GBR\_Usage}(j) \cdot \text{CAC}(j)}{\text{CAC}(j)}, \quad \text{Equation 17}$$

$j$: macro cell index $$U^{macro} = \sum_{j \in macro} U^{nonGBR}(j)$$

Here, j indicates the macrocell index, $U^{nonGBR}(j)$ indicates the amount of radio resources for non-GBR UEs in the $j^{th}$ macrocell, GBR_Usage(j) indicates the GBR load in the $j^{th}$ macrocell, CAC(j) indicates the total load in the $j^{th}$ macrocell, and $U^{macro}$ indicates the amount of radio resources for all macrocells.

At step 605, the ABS ratio determination device determines the amount of radio resources for non-GBR UEs and non-GBR CRE UEs in each picocell. The ABS ratio determination device may identify the total load, non GBR load, and non-GBR CRE load in each picocell on the basis of the reported load information, and may determine the amount of radio resources for non-GBR UEs and non-GBR CRE UEs in the picocell using the identified information. In one embodiment, when the GBR load, non-GBR CRE load, and total load of a picocell are reported to the ABS ratio determination device, the ABS ratio determination device may identify the non-GBR load of the picocell on the basis of the total load and GBR load.

The amount of radio resources for non-GBR UEs and non-GBR CRE UEs in each picocell may be determined according to Equation 18 below.

$$U^{nonGBR}(i) = \frac{100 - \text{GBR\_Usage}(i) \cdot \text{CAC}(i)}{\text{CAC}(i)}, \quad \text{Equation 18}$$

$i$: pico cell index

-continued $$U^{nonGBR,CRE}(i) = \frac{U^{nonGBR}(i)(100 - DAs(i))}{100 - \text{CAC}(i) \cdot \text{GBR\_Usage}(i)},$$

$i$: pico cell index

Here, i indicates the picocell index, $U^{nonGBR}(i)$ indicates the amount of radio resources for non-GBR UEs in the $i^{th}$ picocell, GBR_Usage(i) indicates the GBR load in the $i^{th}$ picocell, CAC(i) indicates the total load in the $i^{th}$ picocell, and $U^{nonGBR,CRE}(i)$ indicates the amount of radio resources for non-GBR CRE UEs in the $i^{th}$ picocell, and DAs(i) indicates the non-GBR CRE load in the $i^{th}$ picocell.

At step 607, the ABS ratio determination device sorts the picocells in descending order of the ratio of the resource amount for non-GBR CRE UEs to the resource amount for non-GBR UEs ($U^{nonGBR,CRE}(i)/U^{nonGBR}(i)$). The ABS ratio determination device may list the picocells in descending order of the ratio of the resource amount for non-GBR CRE UEs.

At step 609, the ABS ratio determination device finds k in the sorted picocell list such that the ABS ratio determined under the assumption that only k sorted picocells ($1^{st}$ to $k^{th}$ picocells) are present becomes greater than the ratio of the resource amount for non-GBR CRE UEs in the $k+1^{th}$ picocell.

The ABS ratio determination device may determine the ABS ratio first under the assumption that only one picocell ($1^{st}$ sorted picocell) is present in the network. Specifically, assuming that only one picocell ($1^{st}$ sorted picocell) is present, the ABS ratio determination device sets the ABS ratio to the ratio of the resource amount for picocell non-GBR CRE UEs to the sum of the resource amount for macrocell non-GBR UEs and the resource amount for picocell non-GBR UEs. The ABS ratio determination device checks whether the ABS ratio is greater than the non-GBR CRE ratio of the resource amount for non-GBR CRE UEs to the resource amount for non-GBR UEs in the $2^{nd}$ sorted picocell. If the ABS ratio is not greater than the non-GBR CRE ratio, the ABS ratio determination device may determine the ABS ratio under the assumption that only two sorted picocells ($1^{st}$ to $2^{nd}$ picocells) are present in the network. Specifically, assuming that only two sorted picocells ($1^{st}$ to $2^{nd}$ picocells) are present, the ABS ratio determination device may set the ABS ratio to the ratio of the resource amount for picocell non-GBR CRE UEs to the sum of the resource amount for macrocell non-GBR UEs and the resource amount for picocell non-GBR UEs. The ABS ratio determination device checks whether the ABS ratio is greater than the non-GBR CRE ratio of the resource amount for non-GBR CRE UEs to the resource amount for non-GBR UEs in the 3rd sorted picocell. This process is continued until the ABS ratio determined under the assumption that only k sorted picocells ($1^{st}$ to $k^{th}$ picocells) are present becomes greater than the non-GBR CRE ratio of the resource amount for non-GBR CRE UEs to the resource amount for non-GBR UEs in the $k+1^{th}$ picocell.

If the ABS ratio determined under the assumption that only k sorted picocells ($1^{st}$ to $k^{th}$ picocells) are present is greater than the non-GBR CRE ratio of the $k+1^{th}$ picocell, at step 611, the ABS ratio determination device determines the ABS ratio finally according to Equation 19 below. Thereby, it is possible to prevent a picocell whose non-GBR CRE load is very low from affecting determination of the ABS ratio, prohibiting the ABS ratio from being too small.

$$\text{ABS\_Ratio} = \min\left(\frac{\sum_{i=1}^{A} U^{nonGBR,CRE}(i)}{U^{macro} + \sum_{i=1}^{A} U^{nonGBR}(i)}, 1 - \frac{\max_{j \in macro} \text{GBR\_Usage}(j)}{100}\right)$$

Equation 19

Here, ABS_Ratio indicates the ABS ratio, $A=k$, $U^{nonGBR,CRE}(i)$ indicates the amount of radio resources for non-GBR CRE UEs in the $i^{th}$ picocell, $U^{macro}$ indicates the amount of radio resources for all macrocells, $U^{nonGBR}(i)$ indicates the amount of radio resources for non-GBR UEs in the $i^{th}$ picocell, and GBR_Usage(j) indicates the GBR load in the $j^{th}$ macrocell.

Equation 19 enables the ABS ratio determination device to determine the ABS ratio in consideration of many GBR UEs remaining in the macrocell. That is, to prevent a problem that macrocell GBR UEs are not sufficiently covered owing to a too low ABS ratio, the ABS ratio determination device may determine the ABS ratio in consideration of a situation where many GBR UEs remain in the macrocell.

As described above, the ABS ratio is determined with respect to a picocell whose non-GBR CRE load is very low. Hence, it is possible to prohibit the ABS ratio from being too low. When the ABS ratio is too low, the GBR usage in the macrocell becomes too high in a non-ABS duration. Accordingly, the ABS ratio determination device may determine the ABS ratio with due consideration of the macrocell load and the picocell load.

At step 613, the ABS ratio determination device checks whether the total load of a macrocell whose total load is lowest among all macrocells is lower than a preset threshold. If the total load of a macrocell with the lowest total load is lower than the preset threshold, at step 615, the ABS ratio determination device sets the ABS ratio to a preset value. That is, when a macrocell with the lowest total load is lightly loaded, if the macrocell can perform data transmission and reception without much difficulty even when a relatively high ABS ratio is used, the ABS ratio may be set to a preset value larger than that computed above.

If the total load of a macrocell with the lowest total load is equal to the preset threshold, the ABS ratio determination device may perform one of the two operations above according to implementation.

Here, how to define the preset threshold and the default ABS ratio is not limited to a particular scheme.

Figure 7:
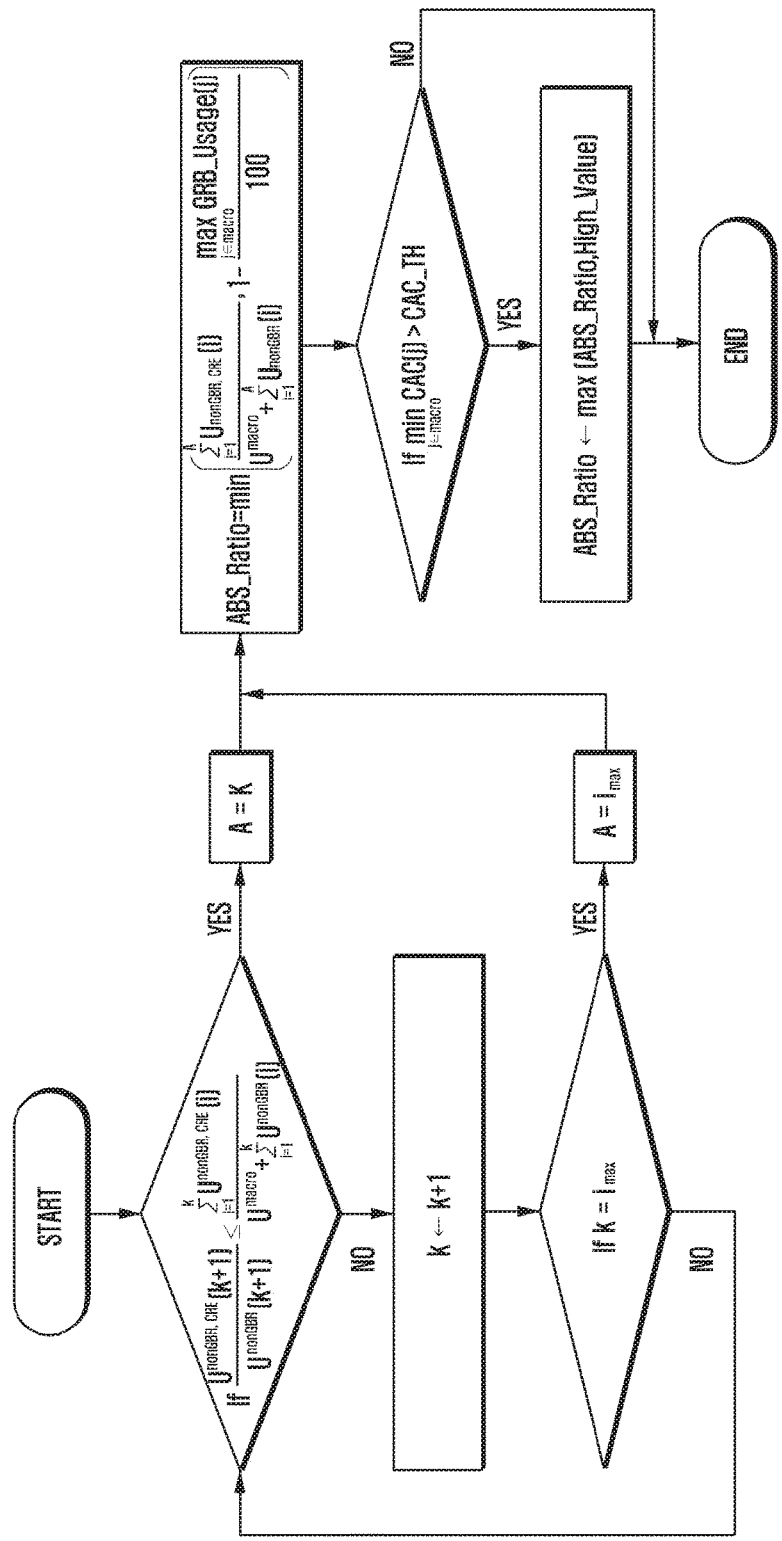
FIG. 7 is a flowchart illustrating detailed steps for ABS ratio determination in the procedure of FIG. 6.

Steps 609 to 615 for ABS ratio determination may be represented as a flowchart of FIG. 7 with mathematical notations. A detailed description of the flowchart is given above. In FIG. 7, $i_{max}$ indicates the number of picocells.

At step 617, the ABS ratio determination device sends the determined ABS ratio to the macro ENB. After the ABS ratio determination device sends the ABS ratio information to the macro ENB, the macro ENB may configure ABSs for all radio resources according to the determined ABS ratio and perform data transmission and reception accordingly.

Figure 8:
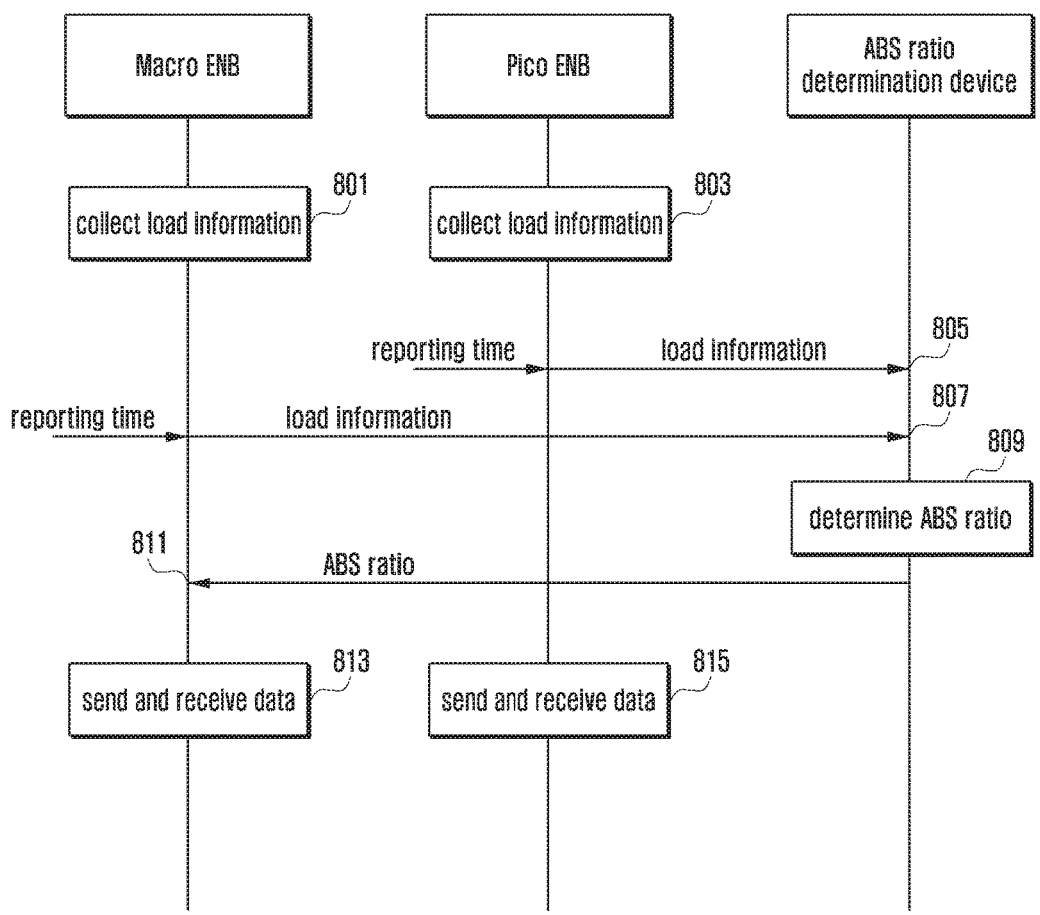
FIG. 8 is a sequence diagram illustrating a procedure for ABS ratio determination according to the present invention.

FIG. 8 is a sequence diagram illustrating a procedure for ABS ratio determination according to the present invention.

Referring to FIG. 8, at step 801, the macro ENB measures the load of the macrocell. The macro ENB may determine the total load, GBR load, and non-GBR load in the macrocell.

At step 803, the pico ENB measures the load of the picocell. The pico ENB may determine the total load, GBR load, non-GBR CRE load, and non-GBR non-CRE load in the picocell.

Upon arrival of a load reporting time, at step 805, the macro ENB reports load information to the ABS ratio determination device; and, at step 807, the pico ENB reports load information to the ABS ratio determination device. The macro ENB may report at least two of the total load, GBR load, and non-GBR load in the macrocell. The pico ENB may report at least three of the total load, GBR load, non-GBR CRE load, and non-GBR non-CRE load in the picocell.

At step 809, the ABS ratio determination device determines the ABS ratio on the basis of the reported load information. The ABS ratio determination device may determine the ABS ratio on the basis of the ratio of the radio resource amount for non-GBR CRE UEs to the total radio resource amount of all cells. In other words, the ABS ratio determination device may determine the ABS ratio on the basis of the ratio of the resource amount for picocell non-GBR CRE UEs to the sum of the resource amount for macrocell non-GBR UEs and the resource amount for picocell non-GBR UEs. Here, the ABS ratio determination device may determine the ABS ratio in consideration of the macrocell GBR load.

If the total load of a macrocell with the lowest total load is lower than a preset threshold, the ABS ratio determination device may set the ABS ratio to the larger one of a preset value and the ABS ratio determined above to enable smooth data transmission and reception in the macrocell. Here, the preset value for the ABS ratio may be large enough to permit smooth data transmission and reception of CRE-zone UEs connected to the picocell.

At step 811, the ABS ratio determination device sends the determined ABS ratio to the macro ENB. The macro ENB may share the received ABS ratio with the pico ENB.

Thereafter, at step 813, the macro ENB sends and receives data to and from UEs in the macrocell according to the determined ABS ratio. At step 815, the pico ENB sends and receives data to and from UEs in the picocell according to the determined ABS ratio. The macro ENB configures ABSs according to the determined ABS ratio and does not perform data transmission and reception at an ABS. At an ABS configured by the macro ENB, the pico ENB may send and receive data to and from UEs in the picocell without interference.

Those skilled in the art will recognize that various changes and modifications of the embodiments described herein can be made without departing from the scope and spirit of the present invention. The embodiments include various specific details to assist in that understanding but these are to be regarded as merely exemplary.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method by an almost blank subframe (ABS) ratio determination device for a wireless communication system, the method comprising:

receiving load information from a first base station and at least one second base station;

determining an ABS ratio based on a ratio of a radio resource amount for at least one cell range expansion (CRE) user equipment (UE) located in a CRE zone of the at least one second base station to a radio resource amount for UEs which are located in a cell of the first base station and a cell of the at least one second base station, the ratio being determined based on the load information; and transmitting the ABS ratio to the first base station.

2. The method of claim 1, wherein the load information includes at least one of information on a total data load of at least one of the first base station and the at least one second base station, information on a data load for guaranteed bit rate (GBR) UEs receiving GBR traffic, or information on a data load for non-GBR UEs receiving non-GBR traffic, wherein the information on the data load for the non-GBR UEs includes at least one of information on a data load for at least one CRE UE among the non-GBR UEs or information on a data load for at least one non-CRE UE among the non-GBR UEs, and wherein the at least one non-CRE UE is located in a serving area of the at least one second base station excluding the CRE zone.

3. The method of claim 1, wherein the determining of the ABS ratio comprises:

determining the ABS ratio based on a ratio of the radio resource amount for the at least one CRE UE among non-GBR UEs of the at least one second base station to a sum of a radio resource amount for non-GBR UEs of the first base station and a radio resource amount for non-GBR UEs of the at least one second base station;

determining the ABS ratio based on a data load for GBR UEs; and configuring, when a total data load of the first base station is lower than a preset threshold, the ABS ratio to a larger one of a preset ABS ratio and the ABS ratio.

4. A method by a first base station for use in a wireless communication system, the method comprising:

reporting load information to an almost blank subframe (ABS) ratio determination device;

receiving an ABS ratio from the ABS ratio determination device; and transmitting and receiving data using a radio resource associated with an ABS configured according to the ABS ratio, wherein the ABS ratio is determined based on a ratio of a radio resource amount for at least one cell range expansion (CRE) user equipment (UE) located in a CRE zone of at least one second base station to a radio resource amount for UEs which are located in a cell of the first base station and a cell of the at least one second base station, the ratio being determined based on the load information.

5. The method of claim 4, wherein the load information includes at least one of information on a total data load of at least one of the first base station and the at least one second base station, information on a data load for guaranteed bit rate (GBR) UEs receiving GBR traffic, or information on a data load for non-GBR UEs receiving non-GBR traffic, wherein the information on the data load for the non-GBR UEs includes at least one of information on a data load for at least one CRE UE among the non-GBR UEs or information on a data load for at least one non-CRE UE among the non-GBR UEs, and wherein the at least one non-CRE UE is located in a serving area of the at least one second base station excluding the CRE zone.

6. The method of claim 4, wherein the ABS ratio is determined based on a ratio of the radio resource amount for the at least one CRE UE among non-GBR UEs of the at least one second base station to a sum of a radio resource amount for non-GBR UEs of the first base station and a radio resource amount for non-GBR UEs of the at least one second base station.

7. A method by a second base station for use in a wireless communication system, the method comprising:

reporting load information to an almost blank subframe (ABS) ratio determination device; and transmitting and receiving data using a radio resource that is associated with an ABS and is allocated by a first base station according to an ABS ratio determined based on the load information, wherein the ABS ratio is determined based on a ratio of a radio resource amount for at least one cell range expansion (CRE) user equipment (UE) located in a CRE zone of the second base station to a radio resource amount for UEs which are located in a cell of the first base station and a cell of the second base station, the ratio being determined based on the load information.

8. The method of claim 7, wherein the load information includes at least one of information on a total data load of at least one of the first base station and the second base station, information on a data load for guaranteed bit rate (GBR) UEs receiving GBR traffic, or information on a data load for non-GBR UEs receiving non-GBR traffic, wherein the information on the data load for the non-GBR UEs includes at least one of information on a data load for at least one CRE UE among the non-GBR UEs or information on a data load for at least one non-CRE UE among the non-GBR UEs, and wherein the at least one non-CRE UE is located in a serving area of the second base station excluding the CRE zone.

9. The method of claim 7, wherein the ABS ratio is determined based on a ratio of the radio resource amount for the at least one CRE UE among non-GBR UEs of the second base station to a sum of a radio resource amount for non-GBR UEs of the first base station and a radio resource amount for the non-GBR UEs of the second base station.

10. A device of almost blank subframe (ABS) ratio determination for use in a wireless communication system, comprising:

a transceiver; and a processor configured to:

receive, via the transceiver, load information from a first base station and at least one second base station, determine an ABS ratio based on a ratio of a radio resource amount for at least one cell range expansion (CRE) user equipment (UE) located in a CRE zone of the at least one second base station to a radio resource amount for UEs which are located in a cell of the first base station and a cell of the at least one second base station, the information being determined based on the load information, and transmit, via the transceiver, the ABS ratio to the first base station.

11. The device of claim 10,
wherein the load information includes at least one of information on a total data load of at least one of the first base station and the at least one second base station, information on a data load for guaranteed bit rate (GBR) UEs receiving GBR traffic, or information on a data load for non-GBR UEs receiving non-GBR traffic,
wherein the information on the data load for the non-GBR UEs includes at least one of information on a data load for at least one CRE UE among the non-GBR UEs or information on a data load for at least one non-CRE UE among the non-GBR UEs, and
wherein the at least one non-CRE UE is located in a serving area of the at least one second base station excluding the CRE zone.

12. The device of claim 10, wherein the processor is further configured to determine the ABS ratio based on a ratio of the radio resource amount for the at least one CRE UE among non-GBR UEs of the at least one second base station to a sum of a radio resource amount for non-GBR UEs of the first base station and a radio resource amount for non-GBR UEs of the at least one second base station.

13. The device of claim 10, wherein the processor is further configured to determine the ABS ratio based on a data load for GBR UEs.

14. The device of claim 10, wherein, when a total data load of the first base station is lower than a preset threshold, the processor is further configured to configure the ABS ratio to a larger one of a preset ABS ratio and the ABS ratio.

15. A first base station for use in a wireless communication system, comprising:
a transceiver; and
a processor configured to:
report load information to an almost blank subframe (ABS) ratio determination device,
receive, via the transceiver, an ABS ratio from the ABS ratio determination device, and
transmit and receive data using a radio resource associated with an ABS configured according to the ABS ratio,
wherein the ABS ratio is determined based on a ratio of a radio resource amount for at least one cell range expansion (CRE) user equipment (UE) located in a CRE zone of at least one second base station to a radio resource amount for UEs which are located in a cell of the first base station and a cell of the at least one second base station, the ratio being determined based on the load information.

16. The first base station of claim 15,
wherein the load information includes at least one of information on a total data load of at least one of the first base station and the at least one second base station, information on a data load for guaranteed bit rate (GBR) UEs receiving GBR traffic, or information on a data load for non-GBR UEs receiving non-GBR traffic,
wherein the information on the data load for the non-GBR UEs includes at least one of information on a data load for at least one CRE UE among the non-GBR UEs or information on a data load for at least one non-CRE UE among the non-GBR UEs, and
wherein the at least one non-CRE UE is located in a serving area of the at least one second base station excluding the CRE zone.

17. The first base station of claim 15, wherein the ABS ratio is determined based on a ratio of the radio resource amount for the at least one CRE UE among non-GBR UEs of the at least one second base station to a sum of a radio resource amount for non-GBR UEs of the first base station and a radio resource amount for the non-GBR UEs of the at least one second base station.

18. A second base station for use in a wireless communication system, comprising:
a transceiver; and
a processor configured to:
report load information to an almost blank subframe (ABS) ratio determination device, and
transmit and receive data using a radio resource that is associated with an ABS and is allocated by a first base station according to an ABS ratio determined based on the load information,
wherein the ABS ratio is determined based on a ratio of a radio resource amount for at least one cell range expansion (CRE) user equipment (UE) located in a CRE zone of the second base station to a radio resource amount for UEs which are located in a cell of the first base station and a cell of the second base station, the ratio being determined based on the load information.

19. The second base station of claim 18,
wherein the load information includes at least one of information on a total data load of at least one of the first base station and the second base station, information on a data load for guaranteed bit rate (GBR) UEs receiving GBR traffic, or information on a data load for non-GBR UEs receiving non-GBR traffic,
wherein the information on the data load for the non-GBR UEs includes at least one of information on a data load for at least one CRE UE among the non-GBR UEs or information on a data load for at least one non-CRE UE among the non-GBR UEs, and
wherein the at least one non-CRE UE is located in a serving area of the second base station excluding the CRE zone.

20. The second base station of claim 18,
wherein the ABS ratio is determined based on a ratio of the radio resource amount for the at least one CRE UE among non-GBR UEs of the second base station to a sum of a radio resource amount for non-GBR UEs of the first base station and a radio resource amount for the non-GBR UEs of the second base station.

* * * * *